Jan. 24, 1967 G. M. WEST 3,300,732

FREQUENCY SYNTHESIZING APPARATUS

Filed March 23, 1964 5 Sheets-Sheet 3

3,300,732
Patented Jan. 24, 1967

3,300,732

FREQUENCY SYNTHESIZING APPARATUS

Gordon Maurice West, Coventry, England, assignor to The General Electric Company Limited, London, England Filed Mar. 23, 1964, Ser. No. 353,731
Claims priority, application Great Britain, Mar. 22, 1963, 11,431/63
4 Claims. (Cl. 331—39)

Figure 1:
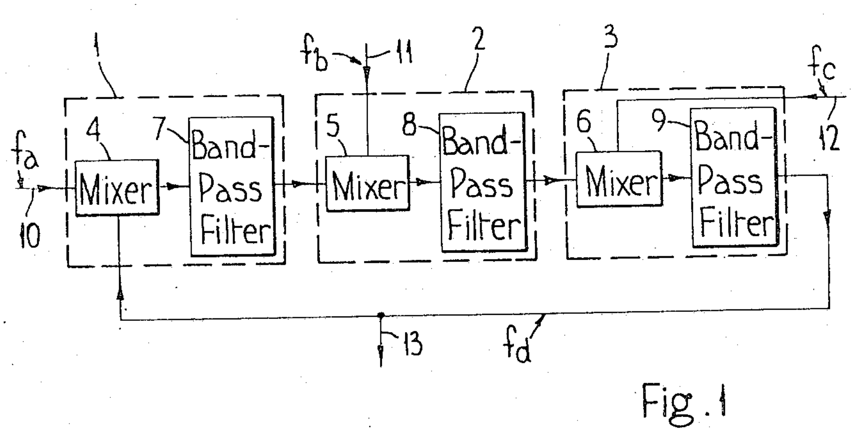

This invention relates to apparatus for supplying electric oscillations.

More particularly, but not exclusively, the invention is concerned with apparatus for supplying electric oscillations which selectively may have any one of a plurality of predetermined frequencies.

One object of the present invention is to provide an improved form of apparatus for deriving electric oscillations from input electric oscillations of variable frequency, the arrangement being such that a change in frequency of the input oscillations produces a smaller change in frequency of the derived oscillations.

According to the present invention, apparatus for supplying electric oscillations comprises three frequency changes which are connected in a ring and one of which is arranged to supply output oscillations of the apparatus, each of these frequency changes being arranged to heterodyne the oscillations supplied by the immediately preceding frequency changer in the ring with further oscillations so as to supply oscillations having either the sum or difference frequency and the arrangement being such that a change $\Delta f$ in the frequency of one of said further oscillations, which constitute input oscillations to the apparatus, produces a change $\Delta f/2$ in the frequency of the output oscillations.

Preferably the arrangement is such that a change in the frequency of said input oscillations results in a change in the same sense in the frequency of said output oscillations.

There may also be provided means to supply said input oscillations, this means being arranged so that the input oscillations may selectively have any one of a plurality of predetermined frequencies. This plurality may conveniently be two.

According to a feature of the present invention, apparatus for supplying electric oscillations comprises a plurality of units connected in cascade, each of these units comprising three frequency changes which are connected in a ring and each of these frequency changers being arranged to heterodyne the oscillations supplied by the immediately preceding frequency changer in the ring with further oscillations so as to supply oscillations having either the sum or difference frequency and the arrangement being such that a change $\Delta f$ in the frequency of one of said further oscillations, which constitutes one of the input oscillations to the apparatus, produces a change $\Delta f/2$ in the frequency of the output oscillations of that unit, the units being so connected that the output oscillations of each unit other than the last one constitute one of the further oscillations of the next succeeding unit and the arrangement being such that, during use, the frequency of the output oscillations of the last of said units may be changed by different amounts by changing the frequency of said input oscillations to each of the units by the same amount.

Preferably each of the units, other than the first, is such that a change in the frequency of the oscillations supplied thereto by the immediately preceding unit results in a change in the same sense in the frequency of the output oscillations of that unit.

There may also be provided means to supply oscillations having two different frequencies and means selectively to feed one or other of these oscillations to the plurality of units to provide one of the further oscillations of each unit, the frequency of the output oscillations being dependent, at any time, upon the particular combination of these oscillations that are so fed to the units.

Figure 2:
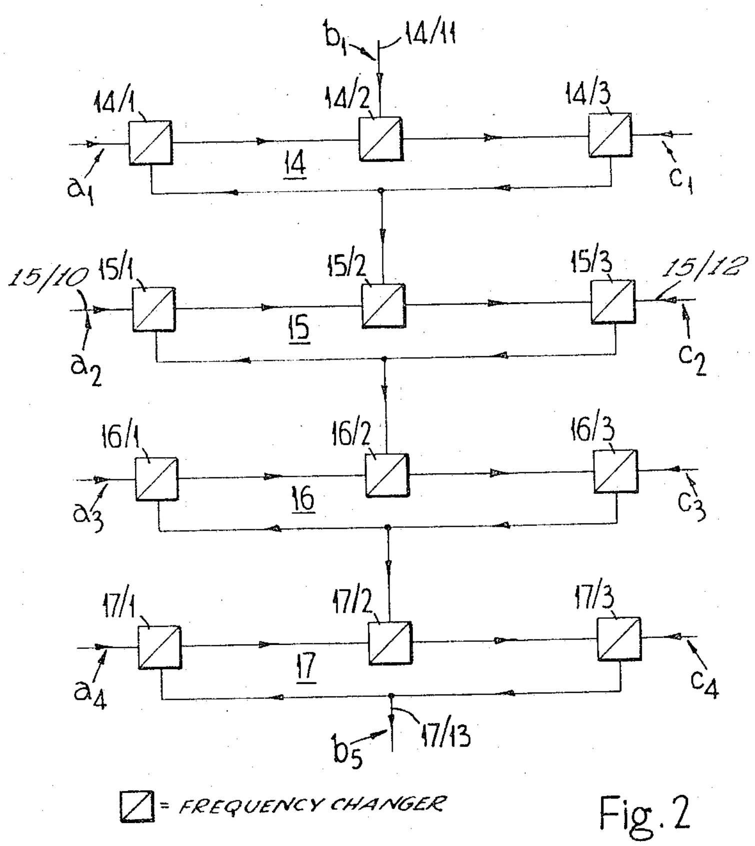
Figure 3:
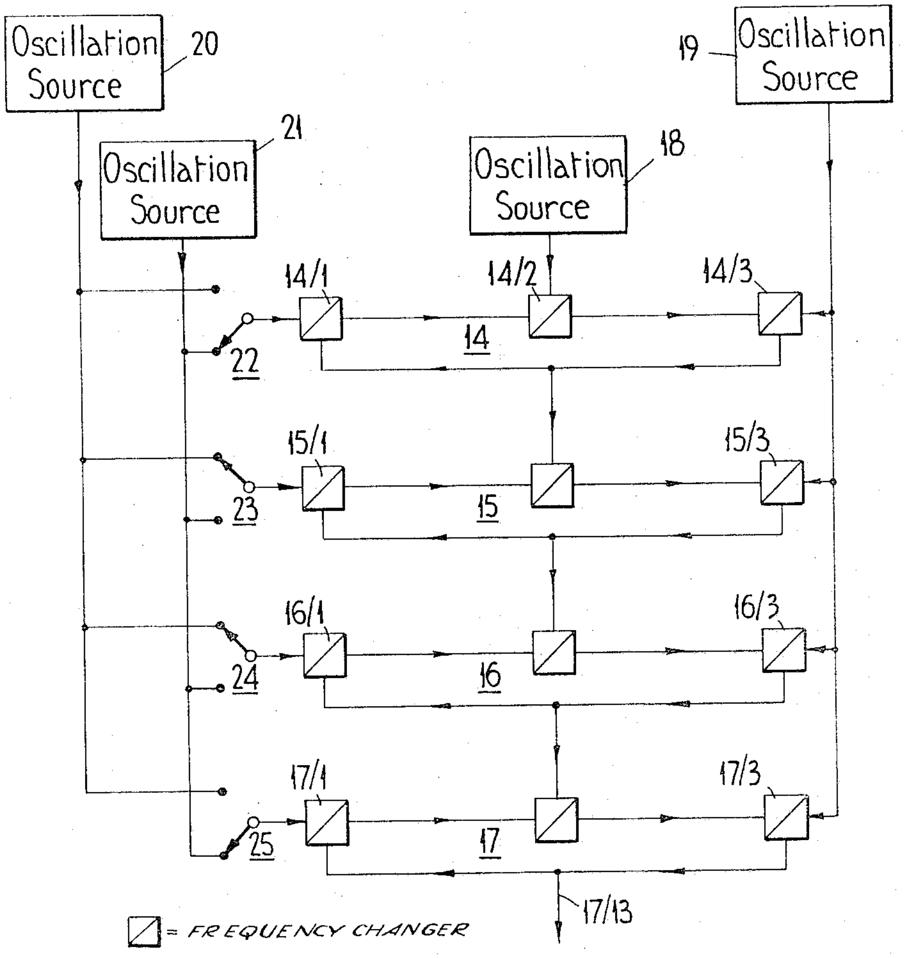
Figure 4:
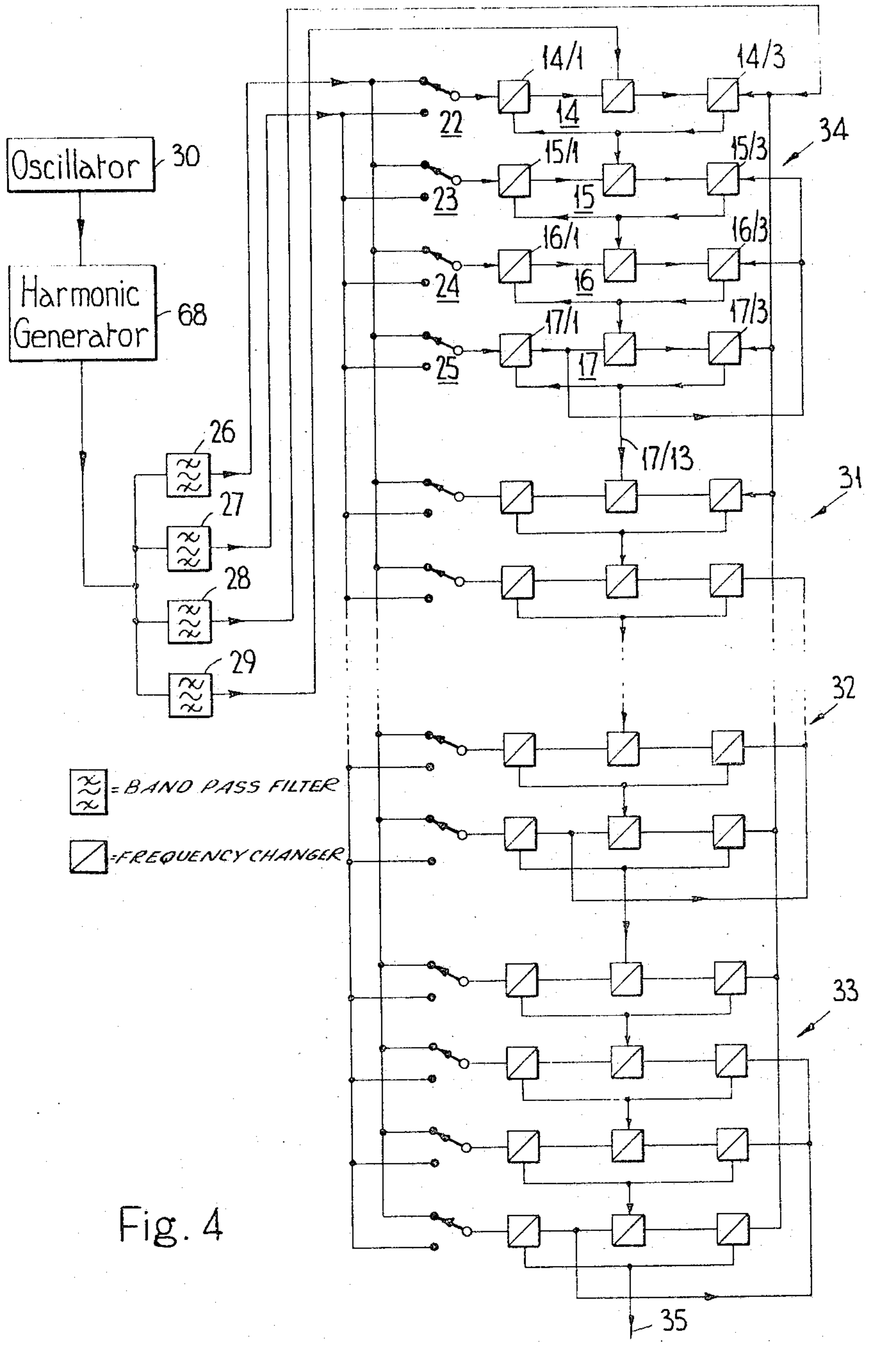
Figure 5:
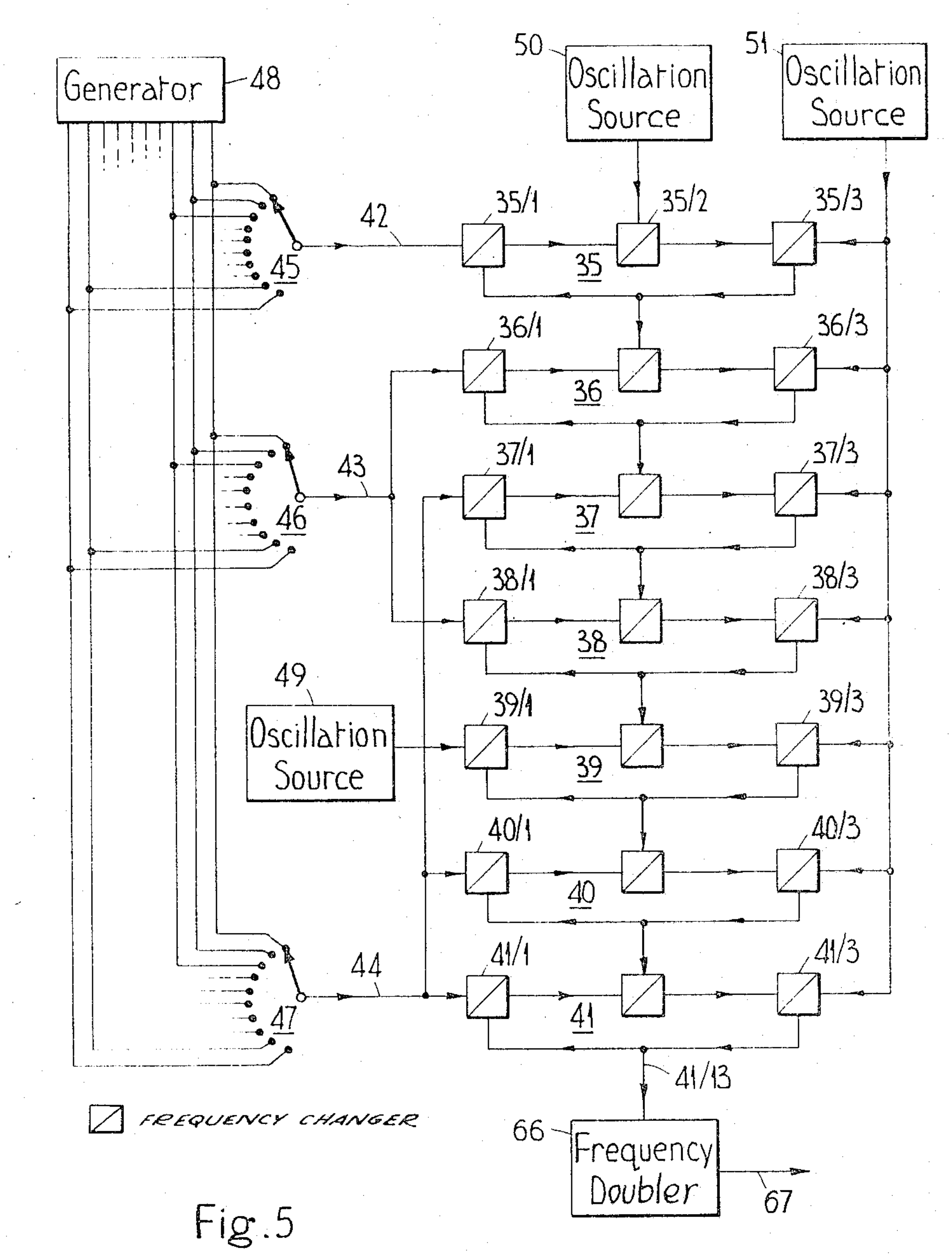
Figure 6:
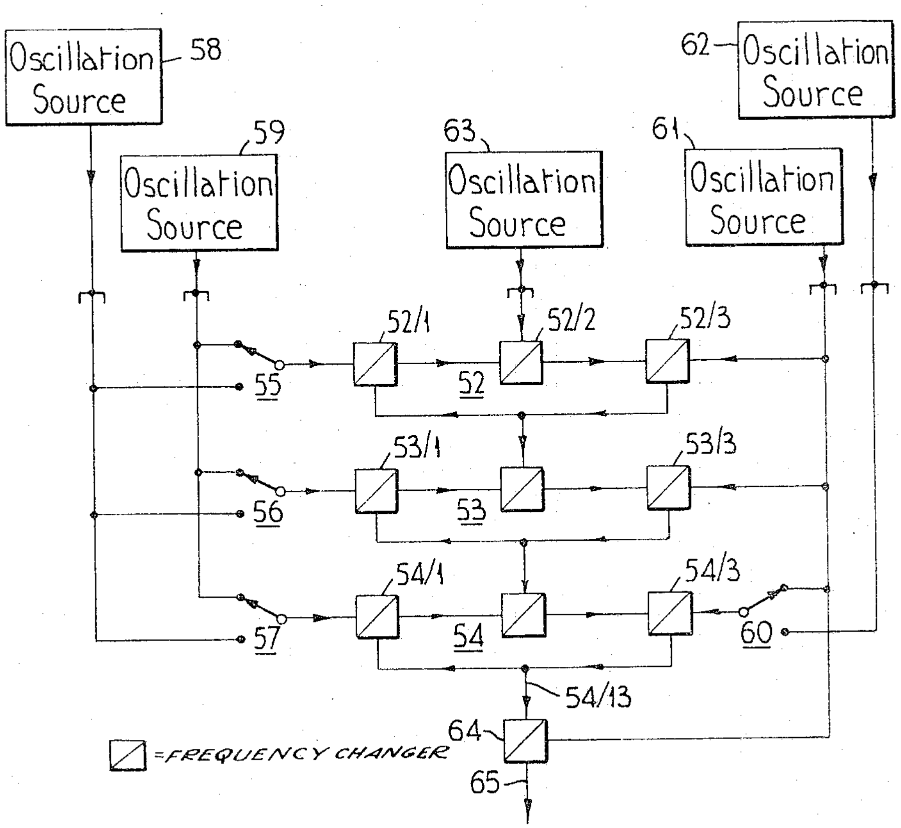

Examples of apparatus in accordance with the present invention will now be described with reference to the accompanying drawings in which:

FIGURE 1 shows diagrammatically a basic form of unit in accordance with the invention, FIGURE 2 is an explanatory diagram showing four of the units of FIGURE 1 connected in cascade, FIGURES 3, 4 and 5 show diagrammatically three examples respectively of synthesising a required frequency, and FIGURE 6 shows a modification of part of the apparatus of FIGURE 5.

Referring now to FIGURE 1, the basic unit now to be considered comprises three frequency changers that are connected in a ring. Each of these frequency changers 1, 2 and 3 comprises a mixer 4, 5 or 6 which is arranged to heterodyne two oscillations, one of which is supplied by the immediately preceding frequency changer in the ring, and a band-pass filter 7, 8 or 9 which is arranged to select oscillations suppiled by the associated mixer having the frequency that is either the sum or the difference of the frequencies of the oscillations supplied to that mixer.

A preferred form of unit is arranged so that if the input oscillations which are supplied to the frequency changers 1, 2 and 3 over paths 10, 11 and 12 have frequencies $f_a$, $f_b$ and $f_c$ respectively and the frequency of the oscillations supplied by the frequency changer 3 is $f_d$, the oscillations supplied by the frequency changers have frequencies as follows:

Frequency changer 1: $f_d - f_a$
Frequency changer 2: $f_b - (f_d - f_a) = f_a + f_b - f_d$
Frequency changer 3: $f_c + (f_a + f_b - f_d)$ The latter frequency is of course equal to $f_d$ so that $$f_d = \tfrac{1}{2}(f_a + f_b + f_c) \qquad (1)$$

Thus a small change $\Delta f$ in any one of the frequencies $f_a$, $f_b$ and $f_c$ produces $\Delta f/2$ in the frequency $f_d$.

As will subsequently be described a plurality of units each as shown in FIGURE 1 may be connected in cascade so that the oscillations supplied to the frequency changer 2 of every unit other than the first are supplied by the frequency changer 3 of the immediately preceding unit. Furthermore the frequencies $f_a$ and $f_c$ are chosen so that, for particular values thereof, the sum of these two frequencies is equal to the frequency $f_b$ so that the Expression 1 reduces to $$f_d = f_b \qquad (2)$$

In other words the units are iterative in that (for the appropriate values of frequency of the oscillations supplied thereto) the oscillations supplied by each unit (other than the first) is the same as the frequency of the oscillations passed thereto by the preceding unit. At the same time a change in the frequency ($f_a$, $f_b$ or $f_c$) of any one of the oscillations supplied to any unit results in a change in the frequency ($f_d$) of the output oscillations of that unit that is in the same sense but of only half the magnitude.

It will further be noted that with the conditions just considered, the frequencies of the oscillation supplied by the frequency changers 1 and 2 are $f_c$ and $f_a$ respectively, that is to say the same frequencies as the first and third input oscillations.

In the unit described the frequency changers 1 and 2 derive difference frequencies while the frequency changer 3 derives the sum frequency. Other arrangements are possible to give an iterative unit although such arrangements do not have all the features referred to in the last sentence of the preceding paragraph but one.

The frequencies $f_a$, $f_b$, $f_c$ and $f_d$ of the iterative unit described may, for example, have the following values:

$f_a$=12 megacycles per second
$f_b$=30 megacycles per second
$f_c$=18 megacycles per second
$f_d$=30 megacycles per second The arrangement shown in FIGURE 2 comprises four cascade connected units 14 to 17 each of which is as described above with reference to FIGURE 1. (For ease of reference to various items shown in FIGURE 2 and subsequent figures, certain items have been given a two part reference, the first part which is given before the oblique stroke is the reference of the appropriate unit while the second part which follows the oblique stroke is the reference of the corresponding item in FIGURE 1.)

It will be appreciated that if the oscillations supplied to the frequency changers 14/1 to 17/1 and 14/3 to 17/3 over paths such as the paths 15/10 and 15/12 have suitable frequencies and the oscillations supplied to the frequency changer 14/2 over the path 14/11 has a particular frequency, the output oscillations supplied by the frequency changer 17/3 over the path 17/13 will also have said particular frequency. If the frequencies of the various input oscillations are variable, it is convenient to specify these frequencies in terms of deviations from the iterative conditions. Such frequency deviations of the oscillations supplied to the frequency changers 14/1 to 17/1 will subsequently be written $a_1$, $a_2$, $a_3$, and $a_4$ respectively, while the frequency deviations of the oscillations supplied to the frequency changes 14/3 to 17/3 will similarly be written as $c_1$, $c_2$, $c_3$ and $c_4$. Again the deviations in frequency of the oscillations supplied to the frequency changer 14/2 over the input path 14/11 and of the output oscillations supplied by the frequency changer 17/3 over the path 17/13 will be written as $b_1$ and $b_5$ respectively.

With the arrangement just described it can readily be shown that the frequency of the output oscillations supplied over the path 17/13 is given by the following expression:

$$b_5=\tfrac{1}{16}(a_1+b_1+c_1)+\tfrac{1}{8}(a_2+c_2)+\tfrac{1}{4}(a_3+c_3)+\tfrac{1}{2}(a_4+c_4) \quad (3)$$

If now the input oscillations supplied to the frequency changer 14/2 and to the frequency changers 14/3 to 17/3 are of fixed frequency, these frequencies being chosen so that $b_1$, $c_1$, $c_2$, $c_3$ and $c_4$ are all zero, the Expression 3 reduces to $$b_5=a_1/16+a_2/8+a_3/4+a_4/2 \quad (4)$$

The apparatus shown in FIGURE 3 is arranged in the manner discussed in the last paragraph, the frequency changer 14/2 being supplied with oscillations of fixed frequency by a source 18 and the frequency changers 14/3 to 17/3 being supplied with oscillations of fixed frequency by a source 19.

If now the input oscillations supplied to each of the frequency changers 14/1 to 17/1 is arranged selectively to have one or other of only two frequencies so that at any time the frequency deviations $a_1$, $a_2$, $a_3$ and $a_4$ are each either zero or $a$, $b_5$ may be varied in frequency steps of $a/16$ between 0 and $15a/16$. This may be arranged, as shown in FIGURE 3, by providing two oscillation sources 20 and 21 to supply oscillations having slightly different frequencies, which correspond to frequency deviations of zero and $a$ respectively, and each of the four units 14 to 17 having associated switching means, for example change-over switches 22 to 25, to select one or other of these oscillations as the input oscillations to the frequency changer 14 of that unit.

It will be appreciated that the operation of the switch 22, 23, 24 and 25 associated with any one of the units 14 to 17 produces one half the change in the frequency of the output oscillations of the apparatus that is produced by operation of the switch associated with the immediately preceding unit (if any) so that each switch may be set to correspond to one digit of a four-digit binary number that defines the frequency deviation ($b_5$) of the output oscillations. If now the oscillations supplied by the source 20 have a frequency corresponding to $a=0$, the switches 22 to 25 in the positions shown in FIGURE 3 result in the output oscillations supplied over the path 17/13 having a frequency equal to that of the oscillations supplied by the source 18 plus $9a/16$.

By increasing the number of cascade-connected units 14 to 17, the number of binary digits may, of course be increased.

The form of apparatus just described may be modified by utilising the oscillations supplied by the frequency changer 17/1 as the input oscillations of the frequency changers 15/3 and 16/3. (It will be appreciated that under iterative conditions the oscillations supplied by the frequency changer 1 of each unit 14, 15, 16 or 17 have the same frequency as the input oscillations supplied to the frequency changer 3.) The frequency deviation, as previously defined, of the oscillations supplied by all three frequency changers 1, 2 and 3 of any one of the four units 14, 15, 16 and 17 is the same execept that, with this modified arrangement $c_2=c_3=b_5$. The input oscillations supplied to the frequency changes 14/3 and 17/3 are as before, namely $c_1=c_4=0$, so that Expression 3 reduces to $$b_5=(a_1+2a_2+4a_3+8a_4+b_1)/10 \quad (5)$$

An arrangement as just described is shown at the top of FIGURE 4 of the accompanying drawings and, as far as possible the same references have been used in this figure as in FIGURES 2 and 3. Again switches 22 to 25 are associated one with each of the four units 14 to 17 so as to enable oscillations having one or other of two frequencies (corresponding to frequency deviations of zero or $a$) to be supplied to the frequency changer 14/1 to 17/1. In this case those oscillations together with the oscillations supplied to the frequency changer 14/2 and the oscillations supplied to the frequency changer 14/3 and 17/3 are selected by means of band-pass filters 26 to 29 from the output of a harmonic generator 68 which is supplied with oscillations by an oscillator 30. By operation of the switches 22 to 25, the frequency of the oscillations supplied over the path 17/13 may be varied (in steps of $a/10$) to have any one of ten different values.

In FIGURE 4 there are shown parts of three further groups 31 to 33 of four cascade-connected units, each of the groups 31 to 33 being identical to the group 34 just described, and the four groups are cascaded with the result that the frequency of the output oscillations supplied over the path 35 may be varied according to a binary-coded decimal code. In this case each group of units 31 to 34 corresponds to one decimal digit of the output frequency while each individual switch, for example the switch 25, is associated with one binary digit of the binary-coded decimal code and is operated in dependence upon the value of that digit.

If now the oscillator 30 has a frequency of 1.000 megacycle per second and the filters 26 to 29 are chosen to select oscillations having frequencies of 12.0, 13.0 and 30.0 megacycles per second respectively, the arrangement is such that the frequency of the oscillations supplied over the path 35 may be varied in steps of 100 cycles per second between 30.0000 and 30.9999 megacycles per second.

Alternatively a plurality of cascade-connected units (each as hereinbefore described with reference to FIG- URE 1) may be arranged to derive oscillations having a required output frequency by combining a plurality of oscillations each of which corresponds to one digit of the required output frequency (expressed as a decimal number) and which may have any one of ten different frequencies according to the particular digit value. FIGURE 5 shows such an arrangement having seven cascade-connected units 35 to 41 and three control oscillations which are supplied over paths 42, 43 and 44, each of these control oscillations being arranged selectively to have any one of ten equally spaced frequencies. These control oscillations are selected by means of switches 45, 46 and 47 from ten oscillations which have respectively the required ten frequencies and which are supplied by a generator 48. The control oscillations supplied over the path 42 constitute input oscillations to the frequency changer 35/1, the control oscillations supplied over the path 43 constitute input oscillations of the frequency changers 36/1 and 38/1 and the control oscillations supplied over the path 44 constitute input oscillations of the frequency changers 37/1, 40/1 and 41/1. Oscillations of fixed frequencies are supplied by sources 49 and 50 to the freqiecy changers 35/2 and 39/1 and by a source 51 to the frequency changers 35/3 to 41/3. The arrangement is such that by operation of the switches 45, 46 and 47 the oscillations fed over the path 41/13 may selectively have any one of one thousand equally spaced frequencies. In fact the oscillations supplied over the path 41/13 are passed to a frequency doubling stage 66 and the frequencies of the oscillations supplied by the generator 48 are such that the position of each of the switches 45, 46 and 47 determines the value of one digit of the value of the frequency of the output oscillations on the path 67 expressed as a decimal number.

The arrangement described in the last paragraph may be extended to provide another decade of frequency control. For example if a further three units are provided, making a total of ten cascade-connected units, fourth control oscillations having any one of ten frequencies may be supplied for this purpose as the input oscillations of the frequency changers 38/3, 40/3 and 41/3 (in place of the oscillation of fixed frequency supplied by the source 51) and also to the corresponding frequency changers of the three further units.

Referring now to FIGURE 6, each of the control oscillations referred to above may be supplied by an associated group of three cascade-connected units 52, 53 and 54 (each as hereinbefore described with reference to FIGURE 1) in place of the switch 45, 46 or 47 and the generator 48. Using the same reference notation as previously, switches 55, 56 and 57 are arranged to select oscillations supplied by either an oscillator 58 or an oscillator 59 as input oscillations to the frequency changers 52/1, 53/1 and 54/1. Similarly a switch 60 selects oscillations supplied by either a source 61 or a source 62 as input oscillations to the frequency changer 54/3, the input oscillations to the frequency changers 52/3 and 53/3 always being supplied by the source 61. The frequency changer 52/2 is supplied with oscillations by a source 63. The frequencies of the oscillations 58, 59; 61, 62 and 63 are so chosen that the frequency of the source 63 is equal to the sum of the frequencies of the sources 58 and 61 and the frequency of the source 59 is equal to that of the source 58 plus $f$ while the frequency of the source 62 is equal to that of the source 61 plus $f$. The oscillations supplied over the output path 54/13 is supplied to a frequency changer 64 together with the oscillations supplied by the source 61. The frequency changer 64 derives oscillations having the difference frequency and it will be realised that, by operation of the switches 55, 56, 57 and 60, the control oscillations supplied over the path 65 may selectively have the frequency of the oscillator 58 or that frequency plus $nf/8$ where $n$ is any integer between 1 and 9.

If now the arrangement of FIGURE 5 is modified by replacing the switches 45, 46 and 47 and the generator 48 by three groups of cascade-connected units as shown in FIGURE 6, the sources 58, 59, 61, 62 and 63 being common to the three groups, the frequency of the output oscillations supplied over the path 67 may be varied in steps of $f/512$. The frequency $f$ may conveniently be 0.512 megacycles per second so that the position of the switches of the three groups of units, for example the switches 55, 56, 57 and 60, determine the values of the hundreds, tens and units digits respectively of the frequency of the oscillations on the path 67 expressed in kilocycles per second. The frequencies of the sources 58, 61 and 63 (FIGURE 6) may be respectively the same as those of the sources 50, 51 and 49 (FIGURE 5).

The switches 22 to 25 (FIGURES 3 and 4) and the switches 55, 56, 57 and 60 (FIGURE 6) may be manually-operable switches. Alternatively the switching may be provided by electromagnetic relays or by diode switching circuits and in either of these cases operation thereof may be controlled by electric signals supplied by a digital computer for the purpose of synthesising a required output frequency.

I claim:

1. Apparatus for supplying electric oscillations including (A) a plurality of like units each of which comprises
  (i) first, second and third input paths,
  (ii) first, second and third heterodyne frequency changers which are connected respectively to the first, second and third input paths,
  (iii) means to connect the first, second and third frequency changers in a ring so that
    (1) the first frequency changer supplies oscillations having a frequency eqal to the difference betwen the frequency of oscillations supplied by the third frequency changer and oscillations supplied over the first input path,
    (2) the second frequency changer supplies oscillations having a frequency equal to the difference between the frequency of oscillations supplied over the second input path and the frequency of oscillations supplied by the first frequency changer, and
    (3) the third frequency changer supplies oscillations having a frequency equal to the sum of the frequency of oscillations supplied by the second frequency changer and the frequency of oscillations supplied over the third input path, and
  (iv) an output path connected to the third frequency changer;

(B) means to cascade-connect said units by connecting the output path of each unit other than the last to the second input path of the following unit;

(C) means to supply oscillations of frequency $f_b$ to the second input path of the first of the cascade-connected units;

(D) means to supply oscillations having a plurality of frequencies one of which is equal to $f_a$;

(E) a plurality of switching means which are each associated with one of said units and which are connected between the last mentioned means and the first input path of the associated unit so as to to pass to the first frequency changer of that unit oscillations having a frequency selected from said plurality; and (F) means to supply to the third input path of all said units oscillations having a frequency $f_c$ which is equal to $f_b - f_a$;

(G) the arrangement being such that when said switching means are operated to supply oscillations of frequency $f_a$ to the first frequency changer of all said units, the oscillations which are supplied over the output path of the last of said cascade-connected units and which constitute the output of the apparatus have the frequency $f_b$, while the frequency of the output oscillations may be changed by selective operation of said switching means.

2. Apparatus according to claim 1 wherein the plurality of frequencies are equally spaced.

3. Apparatus according to claim 2 wherein the pluarilty of frequencies are ten in number.

4. Apparatus according to claim 1 wherein the plurality of frequencies are two in number.

References Cited by the Examiner

FOREIGN PATENTS

| | | |
|---|---|---|
| 1,000,626 | 6/1952 | France. |
| 1,082,943 | 6/1960 | Germany. |
| 847,243 | 9/1960 | Great Britain. |

NATHAN KAUFMAN, *Primary Examiner.*

ROY LAKE, *Examiner.*

J. B. MULLINS, *Assistant Examiner.*